(12) United States Patent
Boodaghians (10) Patent No.: US 6,965,572 B1
(45) Date of Patent: Nov. 15, 2005

(54) LOOPBACK CAPABILITY FOR BI-DIRECTIONAL MULTI-PROTOCOL LABEL SWITCHING TRAFFIC ENGINEERED TRUCKS

(75) Inventor: Samson Boodaghians, Wayside, NJ (US)

(73) Assignee: AT&T Corp., New York, NY (US)

( * ) Notice: Subject to any disclaimer, the term of this patent is extended or adjusted under 35 U.S.C. 154(b) by 579 days.

(21) Appl. No.: 09/589,464

(22) Filed: Jun. 7, 2000

(51) Int. Cl.⁷ .............................................. H04L 12/26
(52) U.S. Cl. ...................................... 370/249; 370/224
(58) Field of Search ................................ 370/224, 249, 370/252, 276, 395.1, 395.21, 395.52, 400, 370/248

(56) References Cited

U.S. PATENT DOCUMENTS

| | | | | |
|---|---|---|---|---|
| 5,889,778 A | * | 3/1999 | Huscroft et al. ........ | 370/395.31 |
| 5,892,924 A | * | 4/1999 | Lyon et al. .................. | 709/245 |
| 5,920,705 A | * | 7/1999 | Lyon et al. .................. | 709/240 |
| 5,991,300 A | | 11/1999 | Tappan | |
| 6,473,421 B1 | * | 10/2002 | Tappan ....................... | 370/351 |
| 6,597,701 B1 | * | 7/2003 | Howell ........................ | 370/410 |
| 6,636,484 B1 | * | 10/2003 | Agrawal et al. ............. | 370/248 |
| 6,647,208 B1 | * | 11/2003 | Kirby ........................... | 398/45 |
| 6,735,190 B1 | * | 5/2004 | Chuah et al. ................ | 370/352 |

OTHER PUBLICATIONS

Neil Harrison—Discussion Paper—"MPLS OAM Functions and PDU Structures", Oct. 1999.
Neil Harrison—Discussion Paper—"OAM Principles for Layer Networks".
Bonica et al.—"ICMP Extensions for MultiProtocol Label Switching", Dec. 1999.
Callon et al—"A Framework for MultiProtocol Label Switching", Sep. 1999.
Rosin et al.—"Multiprotocol Label Switching Architecture", Aug. 1999.
LaFaucheur et al.—"MPLS Support of Differentiated Services", Mar. 2000.
Brin et al.—"Per Hop Behavior Indetification Codes", Oct. 1999.
Krishnaswamy et al.—"MPLS Control Plane for Switched Optical Networks", Feb. 2000.
Suzuki—"The Assignment of the Information Field and Protocol Indentifier in the Q.2941 Generic Identifier and Q.2957 User-to-User Signaling for the Internet Protocol", Jan. 2000.
Yahong—"A Probe Method in MPLS Loop Avoidance", Dec. 1999.
Callon et al—"A Framework for MultiProtocol Label Switching", Sep. 1999.

(Continued)

Primary Examiner—Man U. Phan
Assistant Examiner—Toan Nguyen (57) ABSTRACT

A system and method for introducing a loopback capability for Multi-Protocol Label Switching (MPLS) bi-directional traffic trunks are discussed. MPLS is an emerging technology, which integrates Internet Protocol (IP) routing with label switching techniques. MPLS intends to provide new capabilities in the area of traffic engineering for IP networks. These traffic engineering capabilities will have to be combined with a set of complementary operation, administration and maintenance (OA&M) functions for effectively managing and operating MPLS-based networks. One such function is loopback. A loopback function provides the capability to transmit a OA&M packet on one or more segments of a bi-directional traffic trunk (BTT) in a MPLS network. Using a loopback function, parameters of a BTT, such as connectivity, delay and other Quality of Service (QoS) parameters, can be tested. The system and method provide different techniques for implementing loopback in an MPLS network.

27 Claims, 6 Drawing Sheets

OTHER PUBLICATIONS

Rosin et al.—"Multiprotocol Label Switching Architecture", Aug. 1999.
Ohba et al.—"MPLS Loop Prevention Mechanism", Oct. 1999.
Gibson—"The Management of MPLS", Mar. 2000.
Andersson et al.—"MPLS Capability Set", Oct. 1999.
Fedyk et al.—"Metrics and Resource Classses for Traffic Engineering", Oct. 1999.
Nagami, et al.—"VCID Notification Over ATM Link for LDP", Jul. 1999.
Ashwood-Smith et al.—"Improving Topology Data Base Accuracy With LSP Feedback Via CR-LDP", Feb. 2000.
Wright et al.—"CR-LDP Extensions for Interworking With RSVP-TE", Mar. 2000.
Yahong—"A Probe Method In MPLS Loop Avoidance", Dec. 1999.
Bonica, et al—"ICMP Extensions For MultiProtocol Label Switching", Dec. 1999.
Neil Harrison—Discussion Paper—"MPLS OAM Functions and PDU Structured", Oct. 1999.
Neil Harrison—Discussion Paper—"OAM Principles for Layer Networks".
Andersson et al., "LDP Specification", Oct. 1999.
Andersson et al., "MPLS Capability Set", Oct. 1999.
Ashwood-Smith et al., "Improving Topology Data Base Accuracy With LSP Feedback Via CR-LDP", Feb. 2000.
Awduche et al., "RSVP-TE: Extensions to RSVP for LSP-Tunnels", Feb. 2000.
Awduche et al., "Applicability Statement for Extensions to RSVP for LSP-Tunnels", Apr. 2000.
Bonica et al., "ICMP Extensions for MultiProtocol Label Switching", Dec. 1999.
Boscher et al., "LDP State Machine", Jan. 2000.
Brin et al., "Per Hop Behavior Indetification Codes", Oct. 1999.
Callon et al., "A Framework for MultiProtocol Label Switching", Sep. 1999.
Fedyk et al., "Metrics and Resource Classses for Traffic Engineering", Oct. 1999.
Gibson, "The Management of MPLS", Mar. 2000.
Krishnaswamy et al., "MPLS Control Plane for Switched Optical Networks", Feb. 2000.
Lang et al., "Extensions to RSVP for Optical Networking", Mar. 2000.
Lang et al., "Link Management Protocol (LMP)", Mar. 2000.
LaFaucheur et al., "MPLS Support of Differentiated Services", Mar. 2000.
Martini et al., "Transport of Layer 2 Frames over MPLS", Dec. 1999.
Nagami, et al. "VCID Notification Over ATM Link for LDP", Jul. 1999.
Ohba et al., "MPLS Loop Prevention Mechanism", Oct. 1999.
Rosin et al., "Multiprotocol Label Switching Architecture", Aug. 1999.
Shew, "Fast Restoration of MPLS Label Switched Paths", Oct. 1999.
Suzuki, "The Assignment of the Information Field and Protocol Indentifier in the Q.2941 Generic Identifier and q.2957 User-to-User Signaling for the Internet Protocol", Jan. 2000.
T. Theimer "Requirements for OAM Functionality in MPLS", Oct. 1999.
Wright et al., "CR-LDP Extensions for Interworking With RSVP-TE", Mar. 2000.
Yahong, "A Probe Method In MPLS Loop Avoidance", Dec. 1999.

* cited by examiner

FIG. 1

PRIOR ART

LOOPBACK CAPABILITY FOR BI-DIRECTIONAL MULTI-PROTOCOL LABEL SWITCHING TRAFFIC ENGINEERED TRUCKS

U.S. patent application Ser. No. 09/589,466, entitled "Techniques For Introducing In-Band Network Management Packets In Multi-Protocol Label Switching Networks" and originally filed the same day as the present application, is hereby incorporated by reference.

FIELD OF THE INVENTION

The present invention relates generally to network operation, administration, and maintenance (OA&M) functions for communication networks. More particularly, the present invention relates to a loopback function for networks employing label switching techniques.

BACKGROUND OF THE INVENTION

A typical digital communications network has a network architecture that is based upon the Open Systems Interconnection (OSI) Reference Model for providing communication between a multiplicity of interconnected digital end systems or "nodes." The OSI Reference Model divides networking protocols into seven layers, which, in ascending order of abstraction, are: 1) the physical layer, 2) the data-link layer, 3) the network layer, 4) the transport layer, 5) the session layer, 6) the presentation layer, and 7) the application layer.

Local area networks (LANs), i.e., short-distance communications networks, operate at layer 2 in the OSI model. Routers operate at layer 3 in the OSI model and may connect two LANs or other types of networks having different protocols. More specifically, routers at the network layer terminate local data-link layer protocols and utilize network layer addresses and data frame restructuring to communicate with each other.

Internet Protocol (IP) is a typical layer 3 routing protocol. For IP routing, a router receives a packet and determines a next hop, i.e., the next destination for the received packet in the path towards the final packet destination. Typically, each router in the path to the final destination of the packet analyzes the packet header for identifying the packet's destination address and runs a routing algorithm for determining the next hop towards the identified destination address.

Multi-Protocol Label Switching (MPLS) optimizes conventional routing techniques by assigning labels to a Forwarding Equivalent Class (FEC). A FEC is defined as a set of packets that can be handled equivalently for the purpose of forwarding and thus is suitable for binding to a label. Once a binding between a FEC and a label is done, it is not necessary for each label switching router (LSR) in a label-switched path (LSP), i.e., a path through one or more LSRs followed by packets having the same FEC, to analyze a received packet's IP header for determining the packet's destination address. Instead, LSRs make forwarding decisions based on the label attached to the packet, and consequently packets are routed through the network faster.

MPLS is being developed for high-speed networks that, for example, are used by some Internet-service providers (ISPs). MPLS is currently being standardized by the MPLS Working Group of the IETF (Internet Engineering Task Force).

Figure 1:
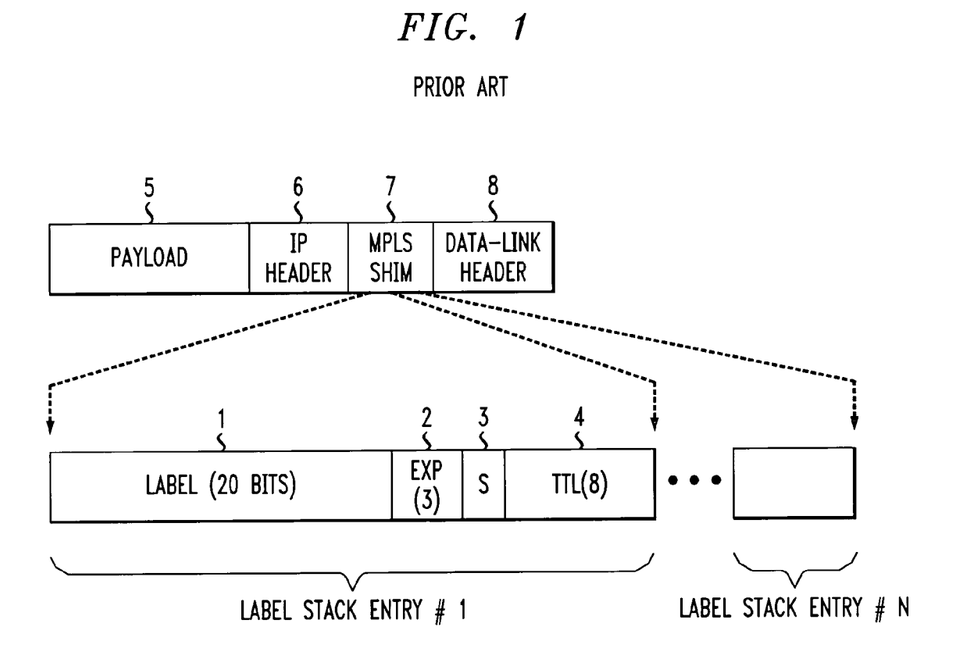
FIG. 1 is a diagram illustrating a format of a packet header used in a MPLS network.

FIG. 1 illustrates an MPLS packet having data-link header 8, MPLS shim header 7, IP header 6 and payload 5. MPLS uses shim header 7 located between the data-link layer header (i.e., data-link header 8) and the network layer header (i.e., IP header 6) for integrating IP routing with label switching. The MPLS architecture encapsulates an IP packet in MPLS shim header 7. MPLS can operate on any layer 2 media (e.g., ATM, FR, PPP), but MPLS currently serves only the IP client network layer. The shim header consists of a series of label stack entries. Each label stack entry contains a 20-bit label field 1, a 3-bit experimental field 2, a single bit field 3 indicating the bottom of the label stack and an 8-bit time-to-live (TTL) field 4.

Similar to conventional routing table entries, each LSR in a MPLS network may include a forwarding table having next hop label forwarding entries (NHLFEs). Each NHLFE, among other information, contains the physical interfaces or ports, the incoming label, and the outgoing label for the next hop for a received packet. A label in a label stack entry of a received packet is used as an index for retrieving a NHLFE containing the next hop for the received packet. Generally, the label from the label stack entry on the top of the label stack is used to index the NHLFEs in the LSR. After identifying the NHLFE for the next hop, the outgoing label for the next hop, which is retrieved from the identified NHLFE, is placed on top of the label stack for the packet, and the packet is transmitted to the next hop. This label switching technique is used by the LSRs for routing MPLS packets through the MPLS network.

Figure 2:
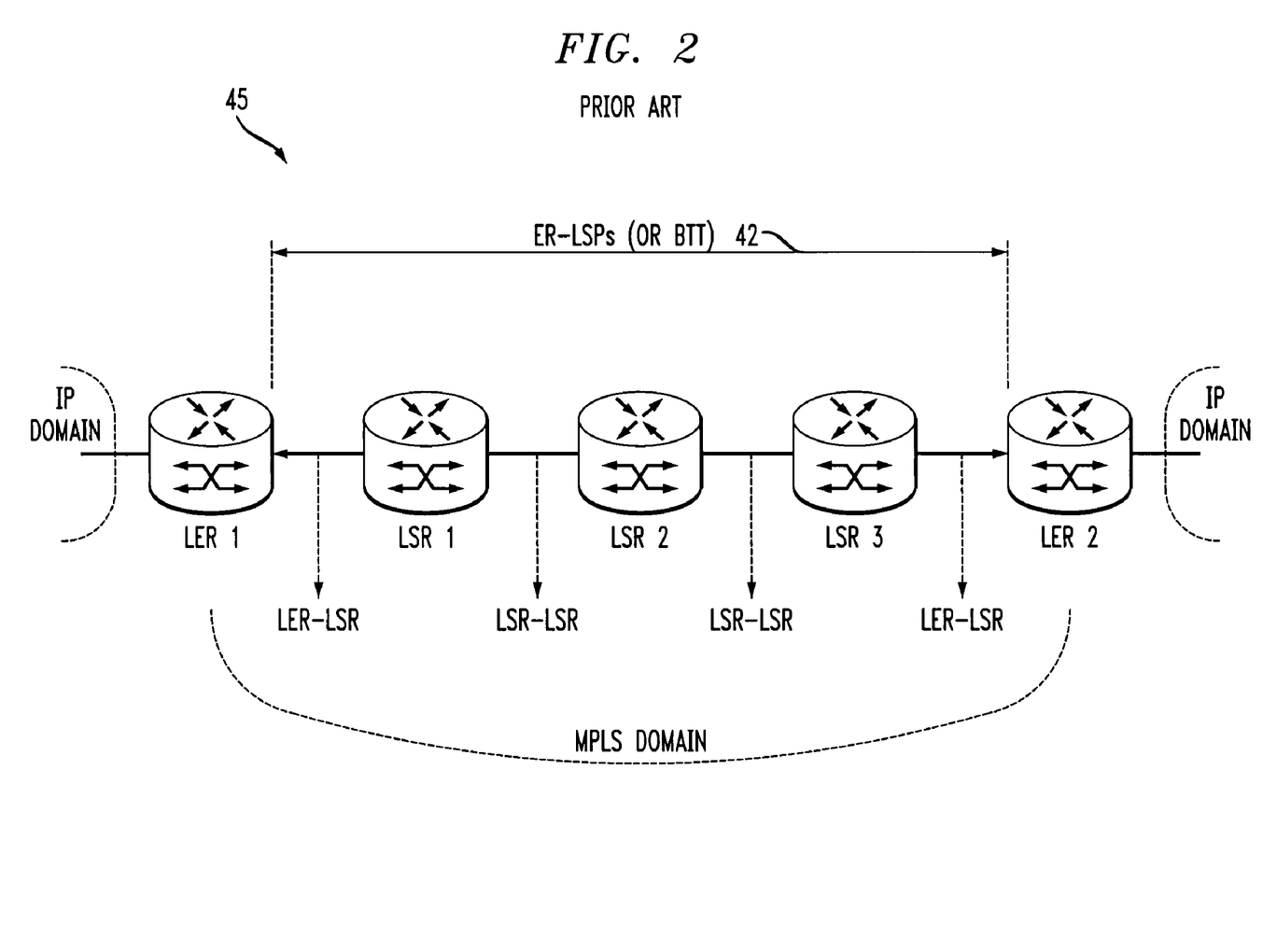
FIG. 2 is a schematic block diagram illustrating a typical BTT within a MPLS network.

FIG. 2 illustrates a reference topology for a typical MPLS network 45. MPLS network 45 includes a set of nodes or LSRs for performing MPLS routing and forwarding. The LSRs in MPLS network 45 include intermediate LSRs and label-edge routers, e.g., LER 1 and LER 2. The set of contiguous nodes that an MPLS packet traverses in the MPLS network is called a Label Switched Path (LSP).

MPLS network 45 includes a bi-directional traffic engineering trunk (BTT) 42 having two traffic engineering trunks with the same endpoints, i.e., LER 1 and LER 2, and opposite directions of transmission. The two traffic trunks that form BTT 42 traverse two unidirectional explicitly-routed label-switched paths (ER-LSPs) between LER 1 and LER 2. An ER-LSP is a LSP defined by a management system or a single LSR that is typically the ingress LSR for that particular direction of transmission, e.g., LER 1 or LER 2. ER-LSPs are set up independently of IP shortest path routing algorithms. BTT 42 is formed of two traffic trunks traversing two ER-LSPs in opposite directions. One traffic trunk flows downstream from ingress LER 1 towards egress LER 2 on one ER-LSP. The other traffic trunk flows upstream from egress LER 2 towards ingress LER 1 on the other ER-LSP. Consequently, BTT 42 traverses a complete round-trip path between LER 1 and LER 2.

It is envisioned that ER-LSPs, which form BTTs, will be set up for carrying possibly hundreds to several thousands of individual IP flows. Hence, it is crucial to ascertain parameters of a BTT, such as connectivity, delay and other quality of service (QoS) parameters that may affect traffic flow in the BTT.

MPLS describes six basic traffic engineering functions that can be performed on a traffic engineering trunk: establish, activate, deactivate, modify attributes, reroute, and destroy. MPLS currently lacks OA&M functions that can provide the ability for ascertaining parameters of a BTT. Hence, a need exists for a set of OA&M functions in MPLS that provide the ability for ascertaining parameters of a BTT.

Hosts use commands, such as Ping and Traceroute, in conjunction with Internet Control Message Protocol (ICMP) for diagnosing routing problems. For example, a router unable to deliver a datagram can send an ICMP message to a host that originated the datagram.

There is a proposed approach for diagnosing routing problems in MPLS networks that relies on layer 3 ICMP messages. This approach, however, can only be implemented if the layer 3 protocol is IP. Furthermore, this approach may be adequate for some OA&M functions (e.g, checking continuity with Ping and Traceroute) from a host to another host or server but will not be adequate for checking continuity and QoS attributes of a TE trunk. The OA&M functions for managing TE Trunks will have to adapt to the coarser flow granularity of the TE trunks in order to achieve scaling when used in large provider networks. Therefore, a need exists for a set of MPLS-layer OA&M functions that provide the ability for ascertaining the parameters of a BTT.

SUMMARY OF THE INVENTION

It is an aspect of the present invention to provide a loopback OA&M function that can be introduced as an additional function to the MPLS traffic engineering framework or as part of a more comprehensive OA&M framework in MPLS. An MPLS-layer loopback function, hereinafter referred to as a loopback function, is a OA&M function providing the capability for testing parameters of traffic trunks in a MPLS network. For example, an originating LSR, i.e., an LSR constructing a loopback packet for transmission on a specific BTT, can send a loopback packet downstream to a loopback LSR. A loopback packet is an OA&M packet intended to be transmitted downstream from an LSR constructing the loopback packet (i.e., from the constructing LSR towards a loopback LSR). A loopback LSR is an LSR that receives the loopback packet and performs a loopback procedure for transmitting the loopback packet upstream, i.e., towards the LSR that constructed the loopback packet. The LSR that constructed the loopback packet receives the loopback packet from the loopback LSR and evaluates one or more BTT parameters using information provided by the loopback packet. The loopback packet may be an in-band network management packet (INMP). An INMP is a label-switched network management packet that carries OA&M information and commands. Each LSR along the BTT receiving the loopback packet may process the loopback packet for testing parameters of the BTT. For example, an LSR receiving a loopback packet for testing delay can perform delay measurements for the packet. Also, once the loopback packet is received by the originating LSR after the loopback procedure is performed, the originating LSR can ascertain tested BTT parameters using the received loopback packet.

It is another aspect of the present invention to provide a technique for performing a loopback procedure in a loopback LSR.

It is still another aspect of the present invention to provide a technique for processing an INMP.

In accordance with the present invention, there is provided a system and method for performing in-service and pre-service loopback functions in an MPLS network. An originating LSR establishes a BTT, and the loopback function is activated at another LSR along the path of the established BTT. The LSR that has activated the loopback function performs a loopback procedure, and at least one parameter of the BTT is evaluated by the originating LSR.

If an evaluated parameter is equivalent to or exceeds a predetermined standard, then the BTT is activated. After the BTT is activated and loaded with user-traffic, at least one parameter of the activated BTT can be periodically tested.

The present invention further provides a system and method for processing an INMP. An LSR constructs and transmits an INMP downstream towards a loopback LSR. An LSR receives the INMP, identifies the received packet as an INMP, processes the INMP and determines whether it is the loopback LSR. If the LSR receiving the INMP is the loopback LSR, then the LSR performs a loopback procedure for transmitting the INMP upstream towards the LSR constructing the INMP.

The present invention further provides methods for performing a loopback procedure in a loopback LSR. An LSR receives an incoming packet travelling downstream on a BTT and identifies an incoming label from the received packet. In a first preferred embodiment of the present invention for performing a loopback procedure, the LSR replaces the identified incoming label with an incoming label corresponding to a received packet travelling upstream on the BTT. Then, the LSR determines the next hop for the received packet using an NHLFE for the replaced label. In a second preferred embodiment of the present invention for performing a loopback procedure, instead of replacing the incoming label, the LSR determines the next hop using a loopback label forwarding entry (LLFE) for the identified incoming label.

The loopback OA&M function of the present invention operates independent of the layer 3 client protocols. That is, it can be used whether or not the layer 3 protocol is IP. If the layer 3 protocol is IP, then all the IP diagnostic tools such as Ping and Traceroute can be used in combination with the proposed OA&M (in this case loopback) functions.

Also, an MPLS network having the loopback OA&M function of the present invention has the ability to test parameters of a BTT. A BTT must be tested prior to loading the BTT with user traffic to ensure, for example, that the BTT is connected and that the BTT has adequate QoS. In addition, the BTT must be tested after being loaded with user traffic to detect data loss caused by a disconnection or inadequate QoS and to take appropriate corrective action. A loopback function can perform double-ended connectivity verification and test QoS. Thus, a loopback function can simplify OA&M for MPLS networks and can potentially reduce unit cost for any MPLS-based network.

Given the tremendous growth of IP traffic and potential migration of circuit-switched and data traffic to an MPLS core transport mechanism, the loopback OA&M function of the present invention can have large impact on the way an MPLS-based network is managed and operated.

BRIEF DESCRIPTION OF THE DRAWINGS

The present invention is illustrated by way of example and not limitation in the accompanying figures in which like reference numerals indicate similar elements and in which.

DETAILED DESCRIPTION

1. Label Switching Router Performing Loopback

Figure 3:
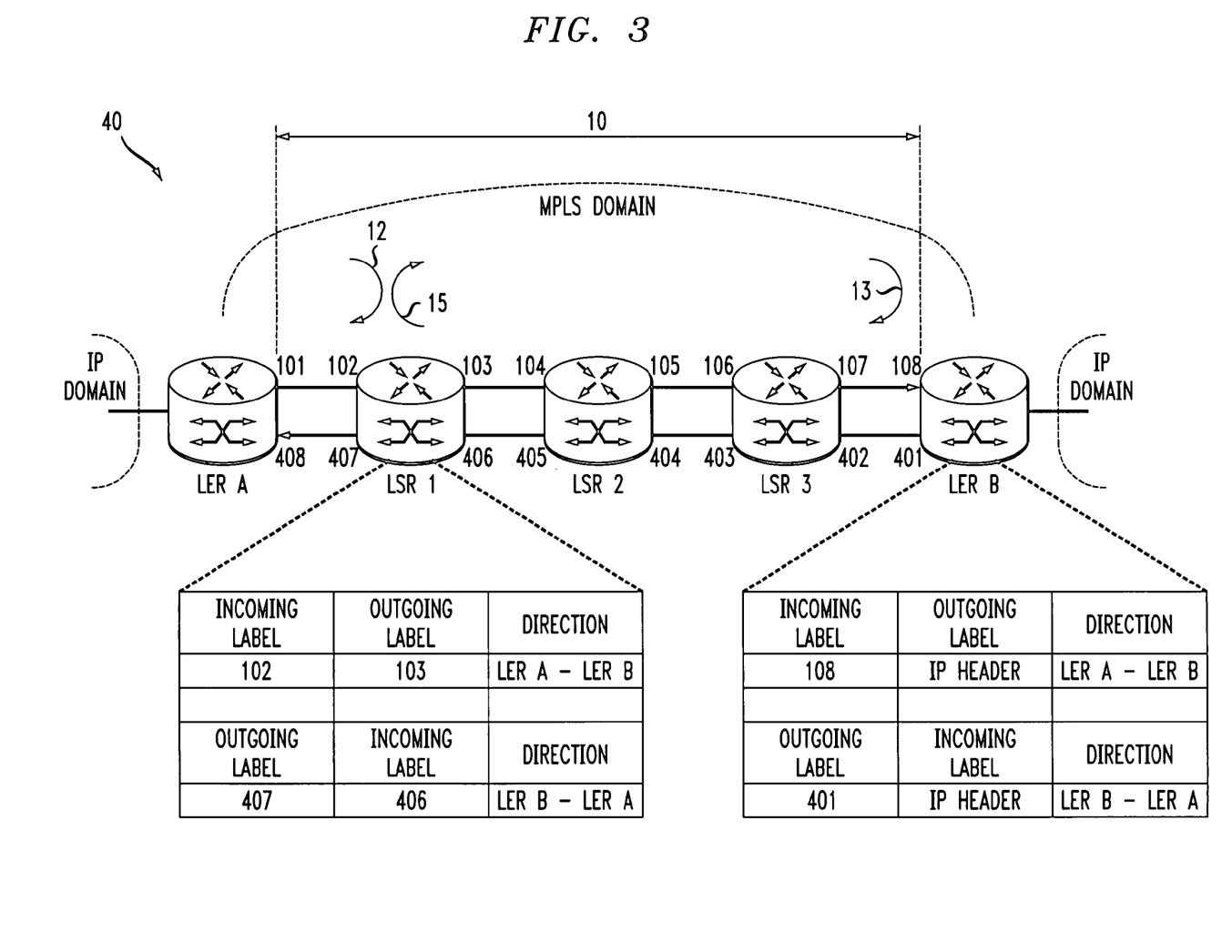
FIG. 3 is a schematic block diagram of a typical BTT within an MPLS network of the present invention.

FIG. 3 illustrates MPLS network 40 and NHLFEs for LSR 1 and LER B. An originating LSR, such as ingress LER A, can activate a loopback function in an intermediate LSR or a LER. As shown using loopback arrows 12 and 13, FIG. 3 illustrates that either an intermediate LSR, such as LSR 1, or a LER, such as LER B, may be a loopback LSR. Using either LSR 1 or LER B as a loopback LSR, a loopback packet, transmitted on BTT 10 from LER A, is transmitted back to LER A on BTT 10 from the loopback LSR.

Figure 4:
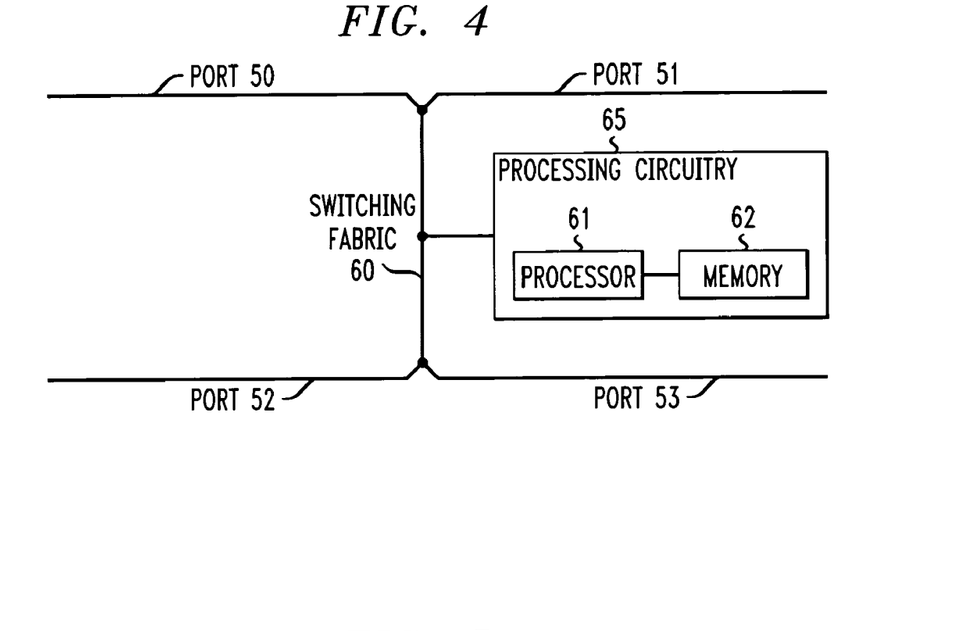
FIG. 4 is a schematic block diagram of a router of the present invention.

FIG. 4 is a schematic block diagram of a preferred embodiment of an LSR performing a loopback procedure in MPLS network 40. The LSR shown in FIG. 4 includes ports 50–53, processing circuitry 65 and switching fabric 60. Each of ports 50–53 includes transmitting circuitry, receiving circuitry and packet assembly circuitry, as is known in the art. Ports 50–53 are connected to processing circuitry 65 through switching fabric 60. The switching fabric, for example, may be a high-speed bus and include one or more multiplexors and demultiplexors. Processing circuitry 65 includes a processor 61 and memory 62. Processor 61 may include a high-speed processor and performs forwarding/routing functions. Memory 62 stores NHLFEs in a table or database for determining a next hop.

Typical operation of the LSR shown in FIG. 4 may include receiving incoming packets at ports 50–53. Packet information from the incoming packets is sent to processing circuitry 65. Processing circuitry 65 processes the packet information to determine the next hop for an incoming packet. For example, processing circuitry 65 can identify an incoming label for each packet, and retrieve an NHLFE corresponding to the incoming label from a table stored in memory 62. The retrieved NHLFE, among other information, contains the label and the physical port for sending the packet to the next hop. Then processing circuitry 65 forwards the packet information with the new label through switching fabric 60 to the port associated with the next hop. The packet information is assembled into an outgoing packet. The outgoing packet is then transmitted to the next hop.

In a first preferred embodiment of the present invention for performing a loopback procedure at a loopback LSR, an incoming packet travelling downstream on BTT 10 is received at a port on the LSR. Processing circuitry 65 identifies the incoming label of the received packet. Then processing circuitry 65 replaces the incoming label with an incoming label corresponding to a received packet travelling upstream on BTT 10. This can be done since the routers are aware that the constituent uni-directional LSPs, which form the BTT, constitute a single logical entity. Processing circuitry 65 retrieves the NHLFE associated with the replaced incoming label, and the received incoming packet is transmitted to a next hop upstream on BTT 10.

In a second preferred embodiment for performing a loopback procedure at a loopback LSR, loopback label forwarding entries (LLFEs) are stored in a table or database in memory 62 in a loopback LSR. LLFEs provide the next hop for a loopback packet. For example, instead of retrieving the NHLFE for the incoming label, processing circuitry 65 retrieves the LLFE for the incoming label. Using the LLFE for the incoming label, processing circuitry 65 determines the next hop for loopback, and the incoming packet is transmitted to a next hop upstream on BTT 10. The LLFEs may be constructed by every LSR immediately after a BTT is established. Alternatively, in order to save processor memory, LLFEs can be constructed only by the loopback LSR immediately after receiving a loopback command. Also, in the latter method, LLFEs may be stored in a loopback LSR for the duration that a loopback procedure is activated in the loopback LSR.

Figure 5:
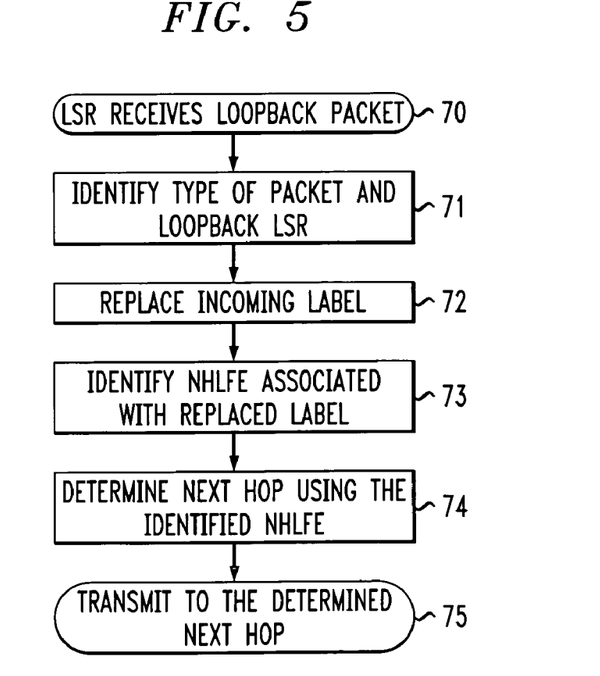
FIG. 5 is a flow diagram of a first preferred embodiment of the present invention for performing a loopback procedure in an LSR.

FIG. 5 is a flow diagram for the first preferred embodiment of the present invention for performing a loopback procedure at an LSR. FIG. 5 will be described using LSR 1 as a loopback LSR, as illustrated in FIG. 3. Loopback arrow 12, in FIG. 3, illustrates a loopback procedure performed at LSR 1. Also, elements of the loopback LSR illustrated in FIG. 4 will be used in the description of FIG. 5. In step 70, LSR 1 receives a loopback packet from LER A on port 50 having incoming label 102 in the loopback packet header. The packet information for the loopback packet is forwarded to processing circuitry 65. In step 71, processing circuitry 65 determines that the packet is a loopback packet from packet header information for the loopback packet, and identifies itself as the loopback LSR for the received loopback packet traveling downstream on BTT 10. Techniques for identifying loopback packets, such as INMPs are described in co-pending U.S. patent application Ser. No. 09/589,466, previously incorporated by reference. In step 72, processing circuitry 65 replaces incoming label 102 with incoming label 406 that corresponds to a packet received from BTT 10 traveling upstream on BTT 10. In step 73, processing circuitry 65 identifies the NHLFE associated with the replaced label 406. For example, processing circuitry 65 may index a table having NHLFEs and retrieve the NHLFE associated with replaced label 406. Processing circuitry 65 determines the next hop using the identified NHLFE (step 74), and the loopback packet is transmitted to LER A in step 75. In per-interface label space method is used (as opposed to per-platform label space), the loopback packet is label switched using the NHLFE associated with the interface corresponding to label 406 in FIG. 3.

Figure 6:
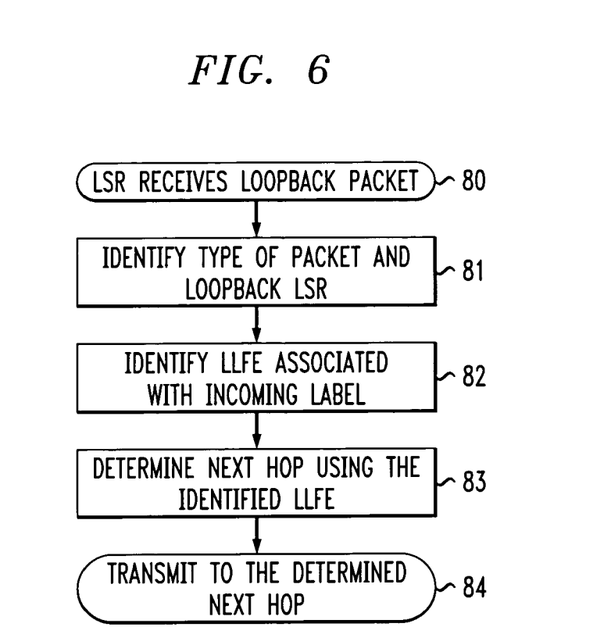
FIG. 6 is a flow diagram of a second preferred embodiment of the present invention for performing a loopback procedure in an LSR.

FIG. 6 is a flow diagram for a second preferred embodiment of the present invention for performing a loopback procedure at a loopback LSR. FIG. 6 will be described using LSR 1 as a loopback LSR, as illustrated in FIG. 3. Loopback arrow 12, in FIG. 3, illustrates a loopback procedure performed at LSR 1. Also, elements of the loopback LSR illustrated in FIG. 4 will be used in the description of FIG. 6. In step 80, LSR 1 receives a loopback packet from LER A on port 50 having incoming label 102 in the packet header. The packet information for the loopback packet is forwarded to processing circuitry 65. In step 81, processing circuitry 65 determines that the packet is a loopback packet from packet header information, and identifies itself as the loopback LSR for the received loopback packet travelling on BTT 10. In step 82, processing circuitry 65 identifies the LLFE associated with incoming label 102. For example, processing circuitry may index a table having LLFEs using incoming label 102, and retrieve the LLFE associated with incoming label 102. Processing circuitry 65 determines the next hop using the identified LLFE (step 83), and the loopback packet is transmitted to LER A in step 84. If per-interface label space is used (as opposed to per-platform label space), the loopback packet is label switched using the LLFE corresponding to the interface on which it has been received (i.e., the interface corresponding to label 102 in FIG. 3).

The first and second preferred embodiments of the present invention for performing a loopback procedure can be performed by an edge LSR, such as LER A or LER B, or an intermediate LSR, as described above. Also, the first and second preferred embodiments of the present invention for performing a loopback procedure may be performed for an in-service loopback function, a pre-service loopback function and a remote loopback function; the in-service, pre-service and remote loopback functions are described in detail below.

2. Pre-Service and In-Service Loopback Functions

Pre-service and in-service loopback functions are two types of loopback functions that may be performed on a MPLS network. The pre-service loopback function is performed prior to loading the BTT with user traffic. For the pre-service loopback function, a loopback procedure is activated in a target LSR (i.e., an LSR that is intended to receive an OA&M command) after establishing a BTT but before activating the BTT. For the in-service loopback function, a loopback procedure is performed at the loopback LSR after the BTT is activated, i.e., while a BTT carries user traffic. The activated procedure for the in-service or the pre-service loopback function may, for example, be a loopback procedure described in either of the first and second embodiments of the present invention for performing a loopback procedure. Both the pre-service and the in-service loopback functions are useful for testing parameters of a BTT, e.g., connectivity, delay and other QoS parameters. For example, a loopback INMP may carry information that contains the address of each traversed LSR, starting with the originating LSR. Using the address information in the loopback INMP, the path traversed by the loopback LSR may be traced, and connectivity of the BTT may be verified.

OA&M commands, such as the one for activating a loopback procedure, may be sent to the target LSR using in-band or out-of band techniques. To activate loopback out-of-band, for example, an "activate loopback" network management (NM) command may be sent from a NM system, e.g., a remote network station or an operator console connected to an LSR. The command instructs the LSR to activate a loopback procedure for a specific BTT, so the loopback function is performed for packets travelling on the specific BTT. For activating loopback in-band, an originating LSR transmits an INMP, carrying, for example, an "activate loopback" command in its payload, to a target LSR. The target LSR, after receiving the INMP, activates a loopback procedure. Then, the target LSR may send an acknowledgement INMP to the originating LSR indicating that it has activated the loopback procedure.

The pre-service loopback function can be performed by activating a loopback procedure using an in-band or out-of-band command, e.g., "activate loopback". The LSR activating the loopback procedure may be a LER or an intermediate LSR. Once a procedure for performing loopback is activated, a loopback INMP can be looped through a BTT for testing parameters of the BTT. For example, a loopback INMP can be used for ascertaining round trip time (RTT) or delay of a BTT. A single clock source at an originating ingress LSR may be used for measuring RTT. Also, loopback may be used for ascertaining connectivity, delay and other QoS parameters for a BTT.

Figure 7:
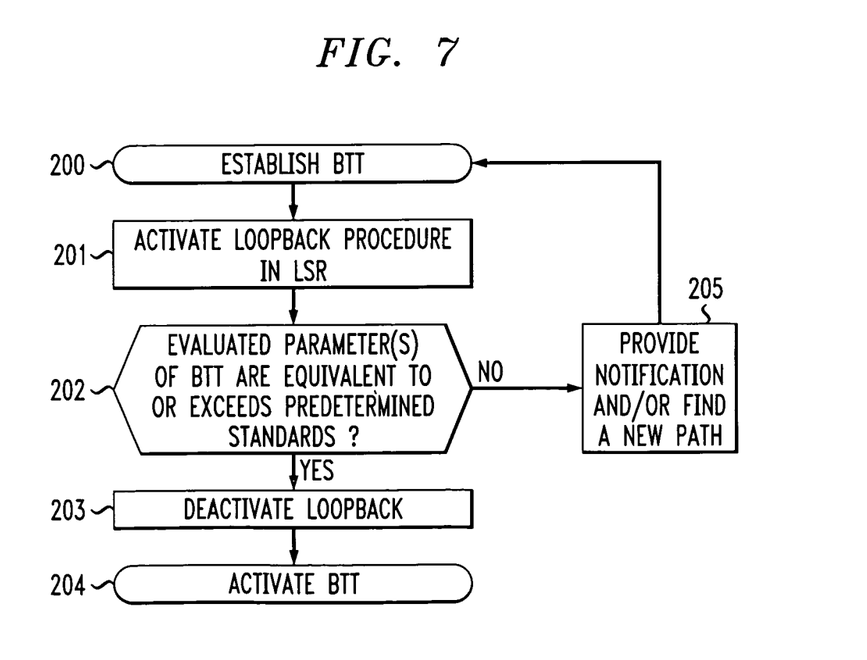
FIG. 7 is a flow diagram for performing a pre-service loopback function.

FIG. 7 is a flow diagram of a preferred embodiment of the present invention for performing the pre-service loopback function. FIG. 7 will be described using a LER, such as LER B shown in FIG. 3, as a loopback LSR. Loopback arrow 13 in FIG. 3 illustrates a loopback procedure activated at LER B for performing a loopback function. In step 200, BTT 10 is established by LER A using a NM command. In step 201, prior to loading BTT 10 with user traffic, an LSR in the path of BTT 10 is selected for performing a loopback procedure. For example, if the entire BTT 10 needs to be evaluated, the opposite edge router, such as LER B, is selected. Otherwise, an intermediate LSR in BTT 10 is selected. In this example, a loopback procedure in LER B is activated using, for example, an in-band or out-of-band "activate loopback" command. Then, LER A transmits a loopback packet, such as a loopback INMP, to LER B. LER B performs the loopback procedure for the received loopback packet and sends the packet upstream towards LER A. The loopback LER, LER B, may set a flag in the payload of the loopbacked INMP indicating that the INMP sent upstream is a loopbacked INMP. In step 202, LER A evaluates at least one parameter of BTT 10. In step 202, LER A, after receiving the loopback packet from LER B, determines whether at least one parameter of BTT 10, such as connectivity, delay, and/or other QoS parameters, is equivalent to or exceeds, i.e., is better than, predetermined standards. A predetermined standard may, for example, include a predetermined tolerance, such as a delay tolerance, or a predetermined threshold, such as a delay threshold or whether a BTT is connected. If one or more tested parameters pass, i.e., the tested parameters are equivalent to or exceed their respective predetermined standards, then a "deactivate loopback" command may be sent in-band or out-of-band to LER B in step 203. For example, if delay is tested for BTT 10, and the predetermined standard is a delay threshold value, then the tested delay passes if the tested delay exceeds, i.e., the tested delay is less than the delay threshold, or is equivalent to the delay threshold. One of ordinary skill in the art, however, can readily set the predetermined standard, so the tested parameter must exceed the predetermined standard to pass. For example, if delay is tested for BTT 10, and the predetermined standard is a delay threshold value, then the tested delay must exceed the delay threshold value, i.e., the tested delay must be less than the delay threshold, for the tested delay to pass. Then BTT 10 is activated in step 204, and BTT 10 is loaded with user traffic, if the at least one tested parameter passes. If one or more tested parameters fail, i.e., one or more tested parameters are not equivalent or do not exceed respective predetermined standards, notification is provided in step 205; for example, alarms can be activated at the NM system, and/or BTT 10 is re-established using another ER-LSP. Then, the remaining steps for implementing the pre-service loopback function are repeated.

As described above, the pre-service loopback function may be performed at a LER, so, for example, bi-directional connectivity for the entire BTT may be tested. Alternatively, the pre-service loopback function may be performed at an intermediate LSR for trouble-shooting a BTT. For example, a trouble spot in a BTT can be isolated by progressively performing a loopback function for consecutive portions of a BTT.

Additionally, when a procedure for performing loopback is activated for the pre-service loopback function, a procedure for performing loopback for the remote loopback function can be activated at the same LSR. The remote loopback function ensures continuity of signal for the remote LER during pre-service BTT testing. The remote loopback function is illustrated with a remote loopback arrow 15 in FIG. 3 for LSR 1. If the remote loopback function is performed, a packet transmitted from LER B will be looped back to LER B. Therefore, LER A can test the portion of BTT 10 between LER A and LSR 1, and LER B can test the remaining portions of BTT 10. A procedure for performing loopback for the remote loopback function may, for example, include the procedures described in the first and second preferred embodiments for performing a loopback procedure.

There is also a need for monitoring parameters of a BTT while the BTT carries user traffic. The in-service loopback function provides the capability to test parameters of a BTT, such as connectivity, delay and/or other QoS parameters, while the BTT carries user traffic. For the in-service loopback function, the loopback LSR must distinguish between user traffic and a network management packet, such as an INMP. For example, a loopback LSR may perform a loopback procedure for a received INMP, while user traffic received by the loopback LSR is forwarded towards its final destination.

Figure 8:
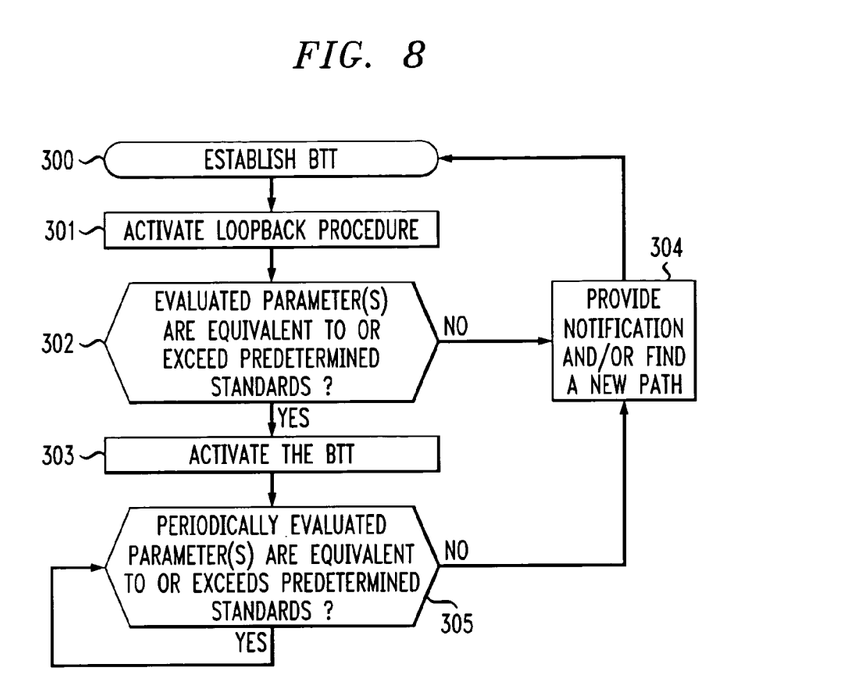
FIG. 8 is a flow diagram for performing an in-service loopback function.

FIG. 8 is a flow diagram of a preferred embodiment of the present invention for performing the in-service loopback function using an INMP. FIG. 8 will be described in conjunction with MPLS network 40, as shown in FIG. 3, using LER B as a loopback LSR. Loopback arrow 13 in FIG. 3 illustrates a loopback procedure performed-at LER B. Steps 300–302 are equivalent to steps 200–202, in FIG. 7, for implementing the pre-service loopback function, because BTT 10 has not been activated. In step 300, BTT 10 is established by LER A using a NM command. In step 301, an LSR in the path of BTT 10 is selected for performing a loopback procedure. For example, if the entire BTT 10 needs to be evaluated, the opposite edge router, such as LER B, is selected. Otherwise, an intermediate LSR in BTT 10 is selected. In this example, a loopback procedure for the pre-service loopback function is activated at LER B using either an in-band or out-of-band command. After activating a loopback procedure at LER B, LER B performs the activated loopback procedure for a received packet. In step 302, LER A evaluates at least one parameter of BTT 10. For example, LER A, after receiving the loopback packet from LER B, determines whether at least one parameter of BTT 10, such as connectivity, delay, and/or other QoS parameters, is equivalent to or exceeds a predetermined standard. If one or more tested parameters pass, then BTT 10 is activated in step 303. BTT 10 is then loaded with user traffic. If one or more tested parameters fail, notification is provided in step 304, for example, to the NM system, and/or BTT 10 is re-established, for example, using another ER-LSP. Then, the remaining steps for implementing the pre-service loopback function are repeated.

After BTT 10 is activated in step 303, at least one parameter for BTT 10 is tested using the in-service loopback function. In step 305, at least one BTT parameter such as connectivity, delay, and/or other QoS parameters is tested periodically. For example, connectivity of BTT 10 may be tested every second using loopback INMPs transmitted once per second from LER A. The period between tests may be increased or decreased depending on characteristics of the network and the desired measurement. If the one or more tested parameters fail in step 305, notification is provided in step 304, for example, to the NM system, and/or BTT 10 is re-established, for example, using another ER-LSP. Then, the remaining steps for implementing the pre-service loopback function are repeated.

3. Processing INMPs

Figure 9:
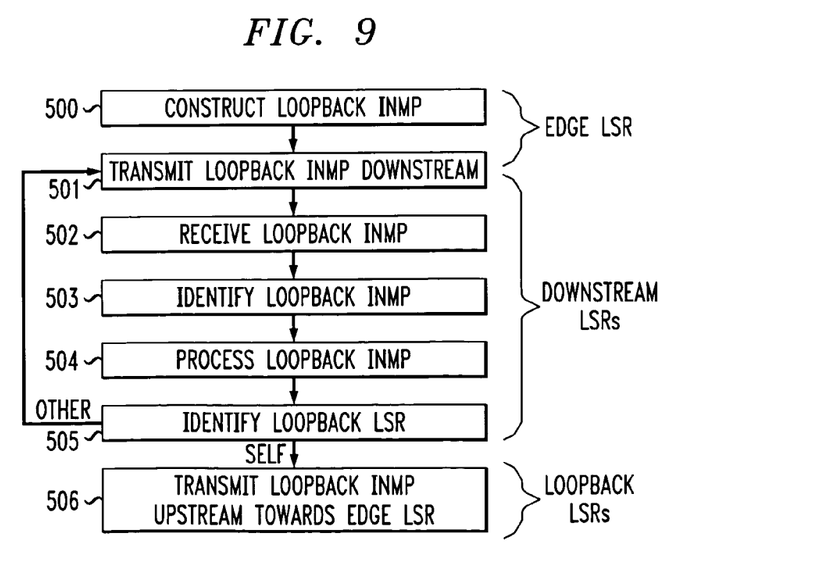
FIG. 9 is a flow diagram for processing loopback INMPs.

FIG. 9 is a flow diagram for processing INMPs. FIG. 9 will be described in conjunction with MPLS network 40 as shown in FIG. 3 and using LER B as a loopback LSR. In step 500, LER A constructs a loopback INMP. In step 501, LER A transmits the loopback INMP downstream towards the loopback LSR, e.g., LER B. LSR 1 is the next hop on BTT 10 in the downstream direction, and LSR 1 receives the loopback INMP in step 502. In step 503, LSR 1 identifies the packet as an IMNP using a MPLS shim header for the INMP. The shim header and its use for differentiating between user packets and INMPs is described in U.S. patent application Ser. No. 09/589,466, previously incorporated by reference. LSR 1 then determines whether the received INMP is a loopback INMP, for example, by reading a command in the payload of that INMP. In step 504, LSR 1 processes the INMP in accordance with the command type in the payload. For example, LSR 1 may determine from a command in the payload that the loopback INMP is for testing at least one parameter of the BTT, such as delay. In step 505, LSR 1 determines whether it is the loopback LSR for the received INMP. The LSR makes the latter determination, for example, by examining the payload and discovering its address in the target LSR address field of the INMP payload. LSR 1 is not the loopback LSR, so LSR 1 transmits the INMP to the next hop downstream, towards the loopback LSR. Steps 501–505 are repeated until LER B receives the loopback INMP. In step 506, after LER B receives the loopback INMP and identifies itself as the loopback LSR for the loopback INMP, LER B transmits the INMP to a next hop upstream, towards LER A. The loopback LER, LER B, may set a flag in the payload of the loopbacked INMP indicating that the INMP sent upstream is a loopbacked INMP.

The flow diagram of FIG. 9 is applicable for both the in-service and the pre-service loopback functions. For pre-service loopback, however, it is not necessary to distinguish between user traffic and INMPs, because the BTT has not been loaded with user traffic. Consequently, for pre-service loopback, determining whether the received packet is an INMP is not necessary.

As discussed above concerning the in-service and the pre-service loopback functions, a loopback INMP may carry an NM command, such as "activate loopback" or "deactivate loopback". If an LSR receiving an INMP containing a command, such as "activate loopback" or "deactivate loopback", determines that the command is intended for itself, the LSR performs the command. Then, instead of transmitting the INMP upstream, towards the originating LSR, the INMP is terminated. This is because the INMP in this case is a command INMP as opposed to a test INMP. The LSR receiving the command may then send a signal to the originating LSR acknowledging that the receiving LSR has performed the command. Thus, in step 506, the loopback INMP may be terminated, if the loopback INMP contains a command for the loopback LSR, such as "activate loopback" or "deactivate loopback."

The present invention is applicable to Internet backbones and enterprise networks. In addition, it is apparent to one of ordinary skill in the art that the present invention can be applied to any label switching network under a single technical administration in which at least two paths exist between two nodes. Furthermore, the present invention can be implemented for ATM, Frame Relay, and optical networks utilizing label switching techniques.

What has been described are the preferred embodiments of the present invention. It, however, will be apparent to those skilled in the art that it is possible to embody the invention in specific forms other than those disclosed in the preferred embodiments described above. This may be done without departing from the spirit of the invention, and the preferred embodiments are merely illustrative and should not be considered restrictive in any way. The scope of the invention is given by the appended claims, rather than the preceding description.

What is claimed is:

1. A method comprising steps of:
   establishing a bi-directional traffic trunk;
   performing a loopback function on the established bi-directional traffic trunk; and
   selecting a label switching router in a path traversed by the bi-directional traffic trunk; and activating a loopback procedure at the label switching router;
   wherein the step of activating a loopback procedure at a label switching router further includes a step of transmitting an in-band network management packet that contains a command for activating the loopback procedure.

2. A method comprising steps of:
   establishing a bi-directional traffic trunk;
   performing a loopback function on the established bi-directional traffic trunk; and
   selecting a label switching router in a path traversed by the bi-directional traffic trunk; and activating a loopback procedure at the label switching router;
   wherein the step of activating a loopback procedure at a label switching router further includes a step of transmitting an in-band network command to the label-switching router instructing the label switching router to activate the loopback procedure.

3. A method comprising steps of:
   establishing a bi-directional traffic trunk; and
   performing a loopback function on the established bi-directional traffic trunk by means of an in-band network management packet;
   wherein the bi-directional traffic trunk is established in a multi-protocol label switching network.

4. A method comprising steps of:
   activating a bi-directional traffic trunk; and
   performing a loopback function on the activated bi-directional traffic trunk by means of an in-band network management packet;
   wherein the activated bi-directional traffic trunk is in a multi-protocol label switching network.

5. A network comprising:
   an originating router configured to transmit a packet downstream on a bi-directional traffic trunk; and
   a loopback router configured to receive the packet and transmit the packet upstream towards the originating router on the bi-directional traffic trunk;
   wherein the originating router is a label edge router, and the received packet is a loopback in-band network management packet.

6. A network comprising:
   an originating router configured to transmit a packet downstream on a bi-directional traffic trunk; and
   a loopback router configured to receive the packet and transmit the packet upstream towards the originating router on the bi-directional traffic trunk;
   wherein the loopback router is at least one of a label edge router and an intermediate label switching router, and the received packet is a loopback in-band network management packet.

7. A network comprising:
   an originating router configured to transmit a packet downstream on a bi-directional traffic trunk; and
   a loopback router configured to receive the packet and transmit the packet upstream towards the originating router on the bi-directional traffic trunk;
   wherein the packet is an in-band network management packet.

8. A network comprising:
   an originating router configured to transmit a packet downstream on a bi-directional traffic trunk; and
   a loopback router configured to receive the packet and transmit the packet upstream towards the originating router on the bi-directional traffic trunk;
   wherein the bi-directional traffic trunk is in a multi-protocol label switching network, and the received packet is a loopback in-band network management packet.

9. A method comprising steps of:
   receiving a packet travelling downstream on a bi-directional traffic trunk;
   transmitting the received packet upstream on the bi-directional traffic trunk; and
   determining the received packet's next hop using a loopback label forwarding entry;
   wherein the bi-directional traffic trunk is in a multi-protocol label switching network, and the received packet is a loopback in-band network management packet.

10. The method of claim 9, further comprising a step of maintaining a table of loopback label forwarding entries.

11. The method of claim 10, wherein the step of maintaining a table further includes a step of maintaining the table of loopback label forwarding entries for the duration the loopback procedure is activated.

12. A method comprising steps of:
    receiving a packet traveling downstream on a bi-directional traffic trunk;
    transmitting the received packet upstream on the bi-directional traffic trunk, and
    determining whether the label switching router receiving the packet is a loopback label switching router for the received packet;
    wherein the bi-directional traffic trunk is in a multi-protocol label switching network, and wherein the step of receiving a packet further includes receiving the packet at a label switching router, and the receiving label switching router is any one of a label edge router and an intermediate label switching router, and the received packet is a loopback in-band network management packet.

13. A method comprising steps of:
    receiving a packet traveling downstream on a bi-directional traffic trunk;
    transmitting the received packet upstream on the bi-directional traffic trunk; and
    determining whether the received packet is a loopback in-band network management packet;
    wherein the bi-directional traffic trunk is in a multi-protocol label switching network.

14. A router comprising:
a plurality of ports, one port of the plurality of ports receiving a packet traveling downstream on a bi-directional traffic trunk; and
processing circuitry processing the packet and forwarding the packet to a selected port of the plurality of ports for transmission to a next hop upstream on the bi-directional traffic trunk;
wherein the processing circuitry identifies an incoming label for the received packet and replaces the identified incoming label with an incoming label corresponding to a received packet traveling upstream on the bi-directional traffic trunk, and wherein the processing circuitry determines whether the received packet is a loopback in-band network management packet and whether the label switching router is a loopback label switching router for the received loopback in-band network management packet.

15. The router of claim 14, wherein the processing circuitry includes a memory that stores routing information, and the processing circuitry determines the next hop upstream using the stored routing information associated with the replaced label.

16. The router of claim 15, wherein the routing information is next hop label forwarding entries.

17. A router comprising:
a plurality of ports, one port of the plurality of ports receiving a packet traveling downstream on a bi-directional traffic trunk; and
processing circuitry processing the packet and forwarding the packet to a selected port of the plurality of ports for transmission to a next hop upstream on the bi-directional traffic trunk;
wherein the processing circuitry includes a memory that stores loopback label forwarding entries wherein the processing circuitry determines whether the received packet is a loopback in-band network management packet and whether the label switching router is a loopback label switching router for the received loopback in-band network management packet.

18. The router of claim 17, wherein the processing circuitry identifies an incoming label for the received packet and determines the next hop upstream using a stored loopback label forwarding entry associated with the identified incoming label.

19. A router comprising:
a plurality of ports, one port of the plurality of ports receiving a packet traveling downstream on a bi-directional traffic trunk; and
processing circuitry processing the packet and forwarding the packet to a selected port of the plurality of ports for transmission to a next hop upstream on the bi-directional traffic trunk;
wherein the router is a label switching router in a multi-protocol label switching network, and wherein the processing circuitry determines whether the received packet is a loopback in-band network management packet and whether the label switching router is a loopback label switching router for the received loopback in-band network management packet.

20. A method comprising steps of:
constructing a packet at a router;
transmitting the packet downstream on a bi-directional traffic trunk from the router constructing the packet;
receiving the packet at a router; and
determining whether to perform a loopback procedure at the router receiving the packet;

wherein the router constructing the packet and the router receiving the packet are label switching routers and wherein the router constructing the packet is an edge router and the router receiving the packet is any one of an edge router and an intermediate router, and the received packet is a loopback in-band network management packet.

21. A method comprising steps of:
constructing a packet at a router;
transmitting the packet downstream on a bi-directional traffic trunk from the router constructing the packet;
receiving the packet at a router; and
determining whether to perform a loopback procedure at the router receiving the packet
wherein the router constructing the packet and the router receiving the packet are label switching routers and wherein the routers are in a multi-protocol label switching network, and the received packet is a loopback in-band network management packet.

22. A method comprising steps of:
constructing a packet at a router;
transmitting the packet downstream on a bi-directional traffic trunk from the router constructing the packet;
receiving the packet at a router; and
determining whether to perform a loopback procedure at the router receiving the packet; and
performing the loopback procedure at the label switching router receiving the packet, when the received packet is a loopback packet and the router receiving the packet is the loopback router for the received packet
wherein
the step of determining whether to perform a loopback procedure further includes a step of determining whether the received packet is a loopback packet, and
the step of determining whether to perform a loopback procedure further includes a step of determining whether the router receiving the packet is a loopback router for the received packet, and the received packet is a loopback in-band network management packet.

23. The method of claim 22, further comprising a step of:
transmitting the received packet to a next hop upstream on the bi-directional traffic trunk, towards the router constructing the packet, after performing the loopback procedure.

24. A network comprising:
a bi-directional traffic trunk;
an originating router constructing a packet and transmitting a packet downstream on the bi-directional traffic trunk; and
a receiving router receiving the packet and determining whether the receiving router is a loopback router for the received packet
wherein the originating router and the receiving routers are label switching routers, and
wherein the originating label switching router is an edge router and the receiving router is any one of an edge router and an intermediate router, and wherein the received packet is a loopback in-band network management packet.

25. A network comprising:
a bi-directional traffic trunk;
an originating router constructing a packet and transmitting a packet downstream on the bi-directional traffic trunk; and a receiving router receiving the packet and determining whether the receiving router is a loopback router for the received packet;

wherein the bi-directional traffic trunk is in a multi-protocol label switching network, and the received packet is a loopback in-band network management packet.

26. A network comprising:

a bi-directional traffic trunk;

an originating router constructing a packet and transmitting a packet downstream on the bi-directional traffic trunk; and a receiving router receiving the packet and determining whether the receiving router is a loopback router for the received packet;

wherein the packet is an in-band network management packet.

27. A method comprising steps of:

establishing a bi-directional traffic trunk; and performing a loopback function on the established bi-directional traffic trunk by means of an in-band network management packet; wherein the loopback function is performed by transmitting one or more loopback packets from a first node to a second node, transmitting the loopback packets from the second node to the first node, and includes the additional steps of storing packet data at the first node, and comparing that stored data with the loopback packet.

* * * * *